United States Patent [19]

Walker

[11] Patent Number: 5,013,453

[45] Date of Patent: May 7, 1991

[54] METHOD FOR REMOVING HEAVY METALS FROM AQUEOUS SOLUTIONS BY COPRECIPITATION

[75] Inventor: Douglas T. Walker, Fullerton, Calif.

[73] Assignee: Union Oil Company of California, Los Angeles, Calif.

[21] Appl. No.: 42,565

[22] Filed: Apr. 16, 1987

Related U.S. Application Data

[60] Division of Ser. No. 126,845, Nov. 25, 1987, Pat. No. 4,847,829, which is a continuation of Ser. No. 721,281, Apr. 8, 1985, Pat. No. 4,710,917, Continuation of Ser. No. 477,212, Mar. 21, 1983, abandoned.

[51] Int. Cl.$^5$ ................................................ C02F 1/52
[52] U.S. Cl. ............................... 210/712; 210/717; 210/721; 210/722; 210/724; 210/726; 210/738; 210/912; 210/913
[58] Field of Search ................................ 75/108, 109; 204/DIG. 13; 210/709, 712, 714, 717, 721, 722, 724, 726, 738, 912, 913

[56] References Cited

U.S. PATENT DOCUMENTS

| | | | |
|---|---|---|---|
| 360,126 | 3/1887 | Tweeddale | 210/722 |
| 961,764 | 6/1910 | Falding | 423/144 |
| 1,825,936 | 9/1931 | Travers | 210/722 |
| 1,994,702 | 3/1935 | Harris | 423/144 |
| 2,144,051 | 1/1939 | Frankforter | 210/722 |
| 2,192,154 | 2/1940 | Schuermann et al. | 75/108 |
| 2,656,282 | 10/1953 | Clarke | 106/304 |
| 2,692,229 | 10/1954 | Heise et al. | 210/712 |
| 2,982,608 | 5/1961 | Clement | 423/186 |
| 3,084,123 | 4/1963 | Hund | 252/62.56 |
| 3,100,158 | 8/1963 | Lemaire et al. | 117/49 |
| 3,347,787 | 10/1967 | Rhodes | 210/722 |

(List continued on next page.)

FOREIGN PATENT DOCUMENTS

| | | |
|---|---|---|
| 24770 | 10/1968 | Japan . |
| 49-11777 | 2/1974 | Japan . |
| 51971 | 5/1975 | Japan . |
| 65050 | 6/1975 | Japan . |
| 67156 | 6/1977 | Japan . |
| 35252 | 4/1978 | Japan . |
| 43673 | 4/1978 | Japan . |
| 67956 | 6/1978 | Japan . |
| 41270 | 4/1979 | Japan . |
| 152613 | 12/1979 | Japan . |
| 1142214 | 2/1969 | United Kingdom . |

OTHER PUBLICATIONS

"Adsorption and Coprecipitation of Silver on Hydrous Ferric Oxide," Willy Dyck, *Canadian Journal of Chemistry*, vol. 46, pp. 1441–1444, (1968).

"Removal of Chromates from Pickling Liquors by Adsorption of Hydrous Ferric Oxide," D. A. Wilms, F. F. Notebaert, and A. A. Van Haute, *Advances in Waste Pollution Research, Proceedings of the Sixth International Conference*, Pergamon Press, Oxford, 1973, pp. 615–623.

"Removal of Toxic Metals from Power Generation Waste Streams by Adsorption and Coprecipitation," Mark M. Benjamin, Kim F. Hayes, and James O. Leckie, *Proceedings of the 35th Industrial Waste Conference, Purdue University*, Ann Arbor Science Publications, Ann Arbor, Mich., 1981, pp. 281–292.

*Inorganic Colloid Chemistry, vol. II, The Hydrous Oxides and Hydroxides*, Harry Boyer Weiser, John Wiley & Sons, Inc., New York, 1935.

"Surface Ionization and Complexation at the Oxide/Water Interface, II. Surface Properties of Amorphous Iron Oxyhydroxide and Adsorption of Metal Ions," James A. Davis and James O. Leckie, *Journal of Colloid and Interface Science*, vol. 67, No. 1, Oct. 15, 1978, pp. 90–107.

"Iron Oxidation in Industrial Waste Streams," W. R.

(List continued on next page.)

Primary Examiner—Peter Hruskoci
Attorney, Agent, or Firm—Gregory F. Wirzbicki

[57] ABSTRACT

A method is provided for removing heavy metal ions from an aqueous solution to yield a less contaminated aqueous effluent. The method comprises coprecipitating the heavy metal ions with a carrier precipitate which is formed in situ within the aqueous solution.

58 Claims, 1 Drawing Sheet

U.S. PATENT DOCUMENTS

| | | | |
|---|---|---|---|
| 3,617,559 | 11/1971 | Cywin | 210/722 |
| 3,619,137 | 11/1971 | Ratcliffe | 23/200 |
| 3,738,932 | 6/1973 | Kostenbader | 210/722 |
| 3,822,210 | 7/1974 | Iwase et al. | 252/62.64 |
| 3,926,754 | 12/1975 | Lee | 204/152 |
| 3,931,007 | 1/1976 | Sugano et al. | 210/717 |
| 3,933,233 | 1/1976 | Randmere et al. | 379/53 |
| 3,947,502 | 3/1976 | Leitner et al. | 423/632 |
| 3,970,738 | 7/1976 | Matsui et al. | 423/140 |
| 4,036,726 | 7/1977 | Gale et al. | 204/231 |
| 4,119,536 | 10/1978 | Iwase et al. | 210/722 |
| 4,123,339 | 10/1978 | Gale et al. | 204/149 |
| 4,169,053 | 9/1979 | Sakakibara et al. | 210/913 |
| 4,318,788 | 3/1982 | Duffey | 204/149 |
| 4,343,706 | 8/1982 | Etzel et al. | 210/667 |
| 4,560,833 | 12/1985 | Weber et al. | 379/53 |
| 4,705,464 | 9/1983 | Baldwin et al. | 210/717 |

OTHER PUBLICATIONS

Kelly and Meint Olthof, *Proceedings of the 37th Industrial Waste Conference, Purdue University*, Ann Arbor Science Publications, Ann Arbor, Mich., 1981, pp. 745–751.

*Die Abwasser in der Metallindustrie* by Weiner, pp. 150, 151, 156, and 157, (English Translation).

"Removal of Toxic Metals from Power Generator Waste Streams by Adsorption and Coprecipitation" by Benjamin et al., *Journal of Water Pollution Control Federation*, vol. 54 (1982), No. 11, pp. 1472–1481.

"Preparation of Ferrites by Wet Method" by Takada et al., Proceedings of the International Conference, Jul., 1970, Japan.

"Uber die Synthese Definierter Eisenoxyde unter Verschiedenen Bedingungen" by Schwertmann.

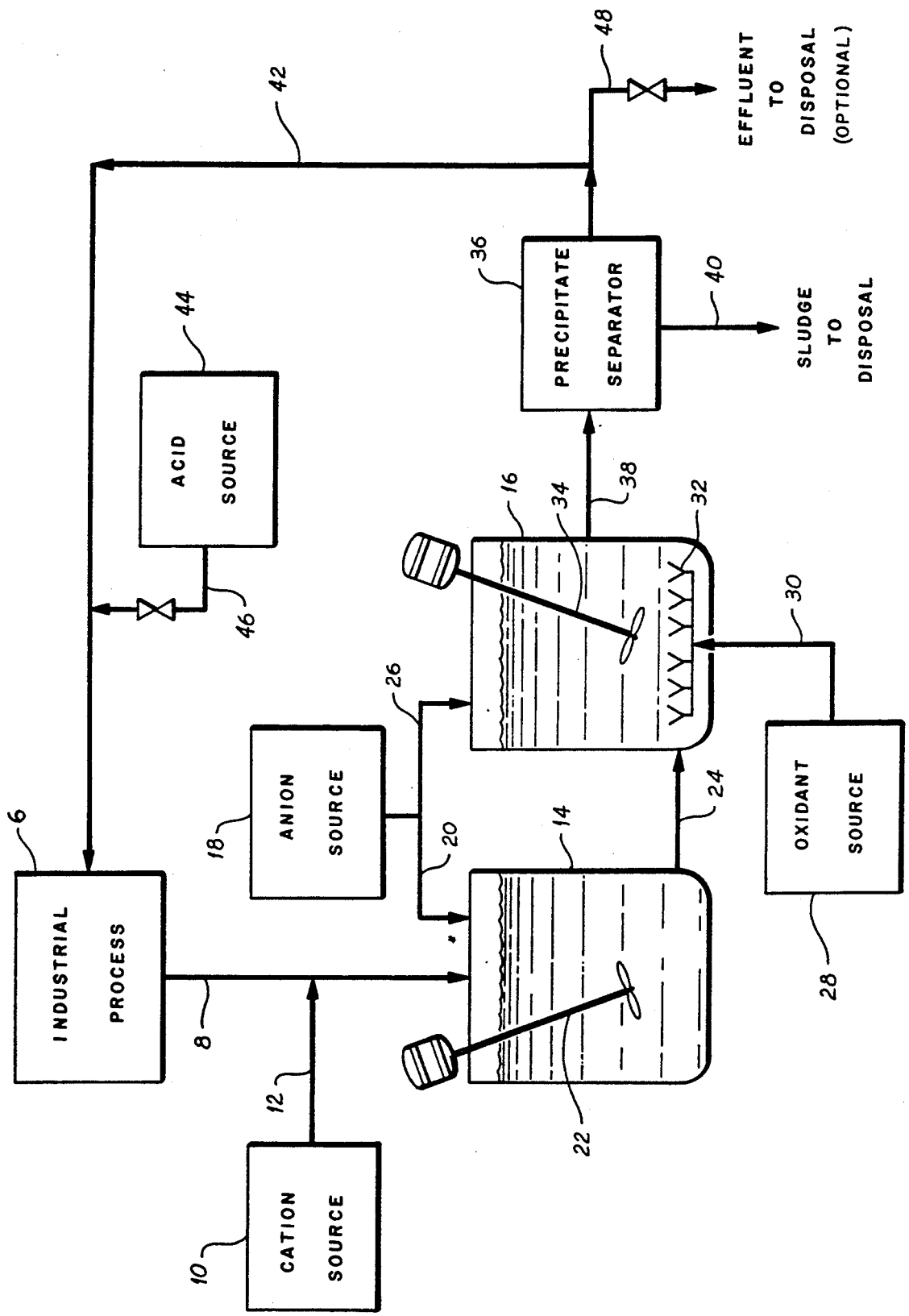

METHOD FOR REMOVING HEAVY METALS FROM AQUEOUS SOLUTIONS BY COPRECIPITATION

This application is a continuation of application Ser. No. 477,212, filed Mar. 21, 1983, now abandoned.

BACKGROUND OF THE INVENTION

This invention relates generally to the removal of heavy metals from aqueous solutions and, in particular, to the removal of heavy metals from aqueous solutions by the method of coprecipitation. As used herein, the term "heavy metals" refers to non-ferrous metals and metaloids (e.g. arsenic) which have an atomic number greater than that of calcium.

There is increasing concern over the hazards posed by the rising levels of heavy metals within the world's water supplies. Most heavy metals are toxic to some degree to all life-forms. Aqueous concentrations of as little as 0.05 ppm can have a deleterious effect on aquatic flora and fauna. In humans, toxic heavy metal poisoning can lead to severe nervous system disorders and can cause death. Even trace amounts of heavy metals within an organism's environment are potentially dangerous, because heavy metals do not decompose over time (as do most organic pollutants) and often accumulate within the organism throughout its lifetime. This accumulation effect is accentuated in succeeding species along each food chain.

As a consequence of the increasing concern over aqueous heavy metal concentration levels, industry is being required to virtually eliminate heavy metals from its aqueous wastes. For many industries, however, this requirement is very difficult to fulfill. The metal finishing industries, for example, employ a variety of processes which generate large volumes of aqueous waste material. Many of these wastes contain high concentrations of heavy metals (often as high as 10 percent), including zinc, nickel, copper, chromium, lead, cadmium, tin, gold and silver. The combined quantity of these wastes generated daily is very large (over one billion gallons in the United States), and the number of plants employing metal finishing processes is also large (nearly 8,000 in the United States). Numerous heavy metals removal methods have been proposed for the metal finishing industries, including dilution, evaporation, alkali-precipitation, absorption, dialysis, electrodialysis, reverse osmosis and ion exchange, but none has been found to be entirely satisfactory.

By far the most common heavy metal removal method is alkali-precipitation. In this method, a sufficient quantity of base is added to the aqueous waste solution to precipitate the desired quantity of heavy metals as insoluble metal hydroxides. However, as governmental heavy metal regulations have become stricter, the alkali-precipitation method has become exceedingly costly, more difficult to use and, in some instances, inappropriate.

Alkali-precipitation must be carried out at high pH (between about 9.0 and about 12.0) in order to reduce the soluble heavy metal concentrations to within acceptable limits. Additive chemical volumes can therefore be quite high. Large quantities of base are required to raise the waste solution pH to treatment conditions and to precipitate the requisite quantity of heavy metals. Large quantities of acid are often required to reduce the pH of the resulting treated effluent, prior to its recycle or disposal. Additive chemical unit costs are also quite high because a costly base such as caustic soda must be employed. The most preferable base, aqueous ammonia (because it is less expensive and easier to handle than caustic soda), is impractical in the alkali-precipitation method. At the high solution pH levels required by the alkali-precipitation method, aqueous ammonia forms soluble complexes with many heavy metal species (especially with copper, nickel and zinc) thereby preventing their precipitation.

Waste streams containing hexavalent chromium, a common contaminant in many metal finishing industry waste solutions, require costly pretreatment because the alkali-precipitation method is ineffective in precipitating hexavalent chromium. The pretreatment step entails reducing the hexavalent chromium to the trivalent state by reaction with a suitable reducing agent, such as sodium bisulfite, at pH levels below 3.0. After pretreatment, the trivalent chromium is precipitated from the solution as a hydroxide by raising the solution pH to above about 9.0.

Waste streams containing organic and nitrogenous complexing agents, also common contaminants in many metal finishing industry waste solutions, require a specialized and especially costly alkali-precipitation treatment. To counter the tendency of the complexing agents to solubilize heavy metals, large quantities of calcium hydroxide must be added to the waste solution. These large quantities of base necessarily raise the pH of the solution to very high levels, and make necessary the eventual use of large quantities of acid to neutralize the resulting effluent. The necessary use of calcium hydroxide also results in significantly increased operating costs because calcium hydroxide exists as a slurry at treatment conditions and is, therefore, very difficult to handle and control. Furthermore, having to use calcium hydroxide in such high concentrations results in large precipitate sludge disposal costs because abnormally large volumes of sludge are produced. This abnormal sludge production stems from (a) the fact that, in addition to the formation of heavy metal precipitates, calcium precipitates are formed as well, and (b) the fact that calcium precipitates tend to retain a large amount of water.

There is, therefore, a need for a superior method for removing heavy metals from aqueous streams, especially from aqueous waste streams produced in the metal finishing industries.

Thus, it is an object of this invention to provide a superior method for removing heavy metals from aqueous waste streams.

It is a further object of this invention to provide a superior method for removing heavy metals from aqueous waste streams without having to adjust the pH of such streams to pH values above 8.0.

It is a still further object of this invention to provide a less costly method for removing heavy metals from aqueous waste streams.

It is a still further object of this invention to provide a superior method for precipitating heavy metals from aqueous waste streams requiring less additive base.

It is a still further object of this invention to provide a method for reconditioning a heavy metals-containing acid stream requiring less additive acid.

It is a still further object of the invention to provide a superior method for removing chromium from an aqueous waste solution.

It is a still further object of the invention to provide a superior method for substantially reducing the concentration of heavy metals within the aqueous waste streams of the metal finishing industries.

These and other objects and advantages of the invention will become apparent to those skilled in the relevant art in view of the following description of the invention.

SUMMARY OF THE INVENTION

In accordance with the present invention, a superior method is provided for removing heavy metals from an aqueous solution. The method comprises coprecipitating the heavy metal ions with a carrier precipitate which is formed in situ within the aqueous solution.

Use of the method of the invention results in reducing the concentrations of aqueous heavy metal ions to below their thermodynamic equilibrium concentrations. This extraordinary result affords the user the unique ability to substantially reduce high aqueous concentrations of heavy metals, often to within legally acceptable concentrations, while maintaining the aqueous solution at near neutral pH.

BRIEF DESCRIPTION OF THE DRAWING

The present invention will be more readily understood by reference to the drawing which schematically illustrates the preferred embodiment of the invention.

DETAILED DESCRIPTION OF THE INVENTION

The method of the invention can be used to remove dissolved heavy metals and/or iron from nearly any aqueous stream. The invention is particularly useful in removing the large concentrations of copper, nickel, zinc, gold, silver, cadmium, tin, chromium and lead from pickling acid wastes and other acidic waste streams formed in the metal finishing industries. In the method of the invention, a selected carrier precipitate is created within an aqueous waste solution which is contaminated with heavy metals and/or iron. The contaminants are thereby caused to coprecipitate with the carrier precipitate and are thus removed from the aqueous solution.

"Coprecipitation" as used with respect to the invention described herein refers to the chemical phenomenon where, within an aqueous solution containing a cationic carrier precipitate precursor, an anionic carrier precipitate precursor and one or more coprecipitant precursors, the cationic and anionic carrier precipitate precursors are caused to chemically react and precipitate out of the aqueous solution as carrier precipitate particles; and, as the carrier precipitate particles are formed, coprecipitant precursors are removed from the aqueous solution by adsorption onto the surface of the carrier precipitate particle and/or by occlusion within the interior of the carrier precipitate particle. The term "occlusion" as used herein refers to the entrapment of foreign ions within a precipitate particle by physical encapsulation within the particle walls and by chemical bonding within the particle structure.

It has been discovered that by the method of the invention a heavy metals-rich aqueous solution can be transformed into a metastable liquid-solid mixture wherein the liquid-phase heavy metal concentrations are substantially lower than their respective equilibrium concentrations. Although the invention is not limited to any particular theory of operation, the reduction of heavy metal concentrations below their equilibrium concentrations is believed to result, in part, from the large quantities of heavy metals which are occluded within the carrier precipitate structure. The proportion of the dissolved heavy metals which become occluded is typically greater than 10 weight percent, frequently greater than 50 weight percent and often greater than 80 weight percent. By segregating the liquid-phase of the mixture from the solid-phase, a stable aqueous effluent is produced which is substantially free of heavy metals. It has been further discovered that the method of the invention results in liquid-phase heavy metal concentrations which are so much lower than their respective equilibrium values that environmentally innocuous liquid effluents can be produced from heavy metals-concentrated solutions, even when the liquid phases are maintained at near neutral pH.

In the preferred embodiment illustrated in the drawing, an acid waste stream containing heavy metal ions in concentrations frequently greater than 1,000 ppmw and often greater than 10,000 ppmw is generated in industrial process 6. This stream is transferred from industrial process 6 via conduit 8. Carrier precipitate precursor cations from source 10 are added to the stream via conduit 12 to raise the concentration of such cations sufficiently so that the molar ratio of such cations to heavy metal ions within the stream is preferably greater than 1:1, more preferably greater than 4:1 and most preferably greater than 8:1. In a preferred embodiment of the invention, wherein the carrier precipitate is amorphous oxyferric hydroxide (hereinafter referred to as "ferric hydroxide"), little or no addition from source 10 may be necessary since waste streams rich in heavy metals are commonly rich in dissolved iron as well.

Carrier precipitate precursor anions are also added to the waste acid stream. Preferably, such anions are added in sufficient quantities to raise the concentration of such anions within the waste stream to above the stoichiometric concentration necessary to react with all solubilized carrier precipitate precursor cations, and more preferably above 110 percent of such stoichiometric concentration. The addition of such anions can be made by injection into conduit 8 (not shown) or by addition to vessels 14 and 16 (as described hereinafter). In the preferred embodiment wherein the selected carrier precipitate is ferric hydroxide, addition of such anions (hydroxyl ions) is made in two stages to allow for accurate pH control. Accordingly, as illustrated in the drawing, the waste acid stream from industrial process 6 is transferred via conduit 8 to mixing vessel 14. Base from source 18, preferably aqueous ammonia, is added to the acid waste solution within vessel 14 via conduit 20. Rapid mixing of the solution within vessel 14 is preferably assured by the use of mixing device 22. Sufficient base is added to the solution within vessel 14 to raise the solution pH to between about 5.5 and about 6.5. The partially neutralized waste solution is then transferred, via conduit 24, to precipitation vessel 16. Via conduit 26, additional base from source 18 is added to the waste solution within vessel 16 in sufficient quantities to raise the solution pH to between about 6.5 and about 8.0, preferably to between about 6.5 and about 7.5.

Within vessel 16, the carrier precipitate precursor cations are caused to react with the carrier precipitate precursor anions and precipitate out of solution. As the carrier precipitate forms, substantial quantities of heavy metal ions coprecipitate with the carrier precipitate and are thereby removed from the solution. In the preferred embodiment wherein the carrier precipitate is ferric hydroxide, precipitation is triggered by the oxidation of ferrous ions to ferric ions. Accordingly, as illustrated in the drawing, an oxidizing agent from source 28, preferably air, is added to the acid waste stream via conduit 30. Sufficient oxidizing agent is added to rapidly oxidize essentially all of the dissolved ferrous ions to ferric ions. When air is the selected oxidizing agent, the rate of air addition is preferably sufficient to oxidize all of the ferrous ions and to air-saturate the solution. Dispersion device 32 and/or mixing device 34 can be used to assure rapid and thorough mixing of the waste solution, additive base and additive oxidant within vessel 16.

The coprecipitant reaction is very rapid. Typically, more than 95 weight percent, and usually more than 99 weight percent, of the heavy metals are removed from the waste solution within about 8 minutes after the formation of the first 5 weight percent of the carrier precipitate. After this 8 minute period, the remaining solubilized heavy metals continue to be adsorbed onto the precipitate particles. However, because the solution-precipitate system is metastable, in some solutions the rate of this additional heavy metal adsorption may tend to be counterbalanced by the slow resolubilization of particular coprecipitated heavy metal species. Thus, the net value of additional contact between the precipitate particles and the supernate liquid (after the initial 8 minute period) varies from system to system. It follows that the ideal residence time of the aqueous solution within vessel 16 and separator 36 (described hereinafter) varies with each particular operating situation, and that the optimizing of such residence time will, in each situation, require some routine adjustment.

From vessel 16, aqueous effluent, now substantially reduced in dissolved heavy metal content, is transferred together with the nascent precipitate to solids separator device 36 via conduit 38. Within separator 36 the effluent and precipitate are segregated into two streams. Separator 36 is comprised of a clarifier, filter, centrifuge, settling pond or other suitable liquid-solid separating equipment capable of segregating the precipitate particles from the aqueous effluent. Segregated precipitate is removed from separator 36 as a sludge and is transferred to a suitable disposal site (not shown) via conduit 40. The corresponding aqueous effluent, which typically contains less than 15 ppmw heavy metals and usually contains less than 5 ppmw heavy metals, can be recycled to industrial process 6 via conduit 42. In those cases where it is desired that the recycled effluent be less basic than the solution within separator 36 (e.g., where the recycled effluent is to be used as an acid makeup solution), acid from source 44 is added to the recycled effluent via conduit 46. Optionally, the treated effluent from separator 36 is discharged to a disposal site (not shown) via conduit 48. Preferably, the concentrations of heavy metals within the treated effluent are reduced to below the relevant legal limits so that non-recycled effluent can be discharged directly to a municipal sewer.

Although the preceeding description of the preferred embodiment assumes that the aqueous waste solution is an acid waste, it is understood that the invention is not limited to the treatment of such wastes. Furthermore, although the preceding description of the preferred embodiment describes a continuous process, it is understood that the invention can also be practiced as a batch process.

Preferably, the choices of carrier precipitate precursors and operating conditions are made so as to maximize the removal of heavy metal ions while minimizing treatment costs. Towards that end the choices are generally made so as to (1) produce a carrier precipitate lattice structure which is conducive to heavy metal occlusion, (2) produce a carrier precipitate particle surface which is conducive to adsorption, (3) form the carrier precipitate as rapidly as possible, and (4) minimize extraneous reactions which interfere with heavy metal coprecipitation.

The carrier precipitate cation and anion are generally chosen so that, when the carrier precipitate is forming, the developing precipitate is conducive to the occlusion of heavy metals. The carrier precipitate cations of choice are those which have approximately the same ionic diameter as most of the contaminant heavy metals. The similarity of ionic diameter makes it conducive for the forming carrier precipitate to accept heavy metal ions in substitution for carrier precipitate cations. When substituted heavy metal ions are similar in size to the cations, the precipitate structure is not unduly stressed by the heavy metal inclusion. Thus, preferably, the ionic diameter of the carrier precipitate precursor cation is between about 75 percent and about 125 percent of the ionic diameter of the most common heavy metal contaminant within the waste solution.

The preferred carrier precipitate cations are metal ions, with the ions of aluminum, calcium, iron and magnesium being more preferred. Most preferred are iron ions, because such ions closely approximate the size of most contaminant heavy metals and because it is common for large natural concentrations of iron ions to be dissolved within heavy metals-rich waste streams.

The carrier precipitate anions of choice are those which form insoluble salts with the contaminant heavy metals as well as with the carrier precipitate cations. Such anions have a strong attraction for heavy metal ions, and the degree of heavy metal occlusion is directly proportional to the strength of the anion-heavy metal bonds. This proportionality stems from the fact that, before heavy metal occlusion can occur, the heavy metal ions must first be drawn to and strongly held by the anions at the surface of the carrier precipitate. When the carrier precipitate cations are ferric ions, the preferred carrier precipitate anions are hydroxyl, phosphate and carbonate ions. When the carrier precipitate cations are calcium ions, the preferred anions are hydroxyl, phosphate, carbonate and sulfate ions. When the carrier precipitate cations are aluminum, the preferred anions are hydroxyl and phosphate ions. When the primary precipitate cations are magnesium, the preferred anions are hydroxyl, phosphate and carbonate ions. The preferred carrier precipitates are aluminum hydroxide, ferric hydroxide, calcium sulfate, iron phosphate and calcium phosphate, with ferric hydroxide being most preferred.

The operating conditions are also generally controlled so as to produce a carrier precipitate particle surface which is conducive to the absorption of heavy metal ions. As explained above, the carrier precipitate anion is chosen from among those anions which form strong bonds with the contaminant heavy metal ions. In addition, the concentration of carrier precipitate precursor anions in solution is maintained in most cases at levels sufficiently in excess of the concentration of the carrier precipitate precursor cations so as to assure that the carrier precipitate particle surface is anionic. The anionic particle surface attracts the heavy metal ions, binds them (adsorption) and makes them available for incorporation within the precipitate structure (occlusion). When hydroxyl ions are the chosen carrier precipitate anions, maintaining such anion excess is a matter of pH control. Where ferric hydroxide is the chosen carrier precipitate, solution pH during coprecipitation is maintained above about 6.0 because solutions which are more acidic cause the ferric hydroxide precipitate surface to take on a cationic character.

In general, the larger the carrier precipitate surface area, the more heavy metals are removed from solution. Thus, the carrier precipitate and the conditions of operation are preferably chosen so as to maximize the surface area of each unit mass of precipitate. The total mass quantity of produced carrier precipitate is thereafter controlled, where possible, to the minimum value sufficient to remove the requisite quantity of heavy metals.

The carrier precipitate is generally formed as rapidly as possible because the removal of heavy metal ions by both the adsorption and occlusion mechanisms is markedly greater at higher precipitation rates. Typically, about 95 percent of the carrier precipitate is formed within about 15 minutes, preferably within about 10 minutes, and more preferably within about 5 minutes. The adsorption of heavy metal ions is increased by an increase in the precipitation rate because adsorption is surface area-dependent. When the carrier precipitate is formed rapidly, it forms as a large number of small individual particles, each having a high surface area-to-mass ratio. By relative comparison, when the carrier precipitate is formed slowly, it forms as a small number of large particles, each having a low surface area-to-mass ratio. Thus, for a given mass of carrier precipitate precursors, the faster the precipitate is formed the larger is the combined surface area of the resulting precipitate particles.

The occlusion of heavy metal ions is increased by an increase in precipitation rates because occlusion is absorption-dependent and diffusion time-dependent. As alluded to above, heavy metal ions are more likely to be occluded within the carrier precipitate when they are first adsorbed at the carrier precipitate surface. Thus, the number of heavy metal ions occluded within the carrier precipitate is proportional to the number of heavy metal ions adsorbed onto the carrier precipitate surfaces during the growth of the carrier precipitate particles. The number of heavy metal ions which are occluded within the carrier precipitate is inversely proportional to the relative ionic diffusion times available in the vicinity of the forming carrier precipitate. Heavy metal ions which initially bond with precipitate surface anions and which might otherwise be eventually incorporated as a part of the particle framework, tend to be displaced by competing carrier precipitate precursor cations which diffuse to the precipitate surface. Thus, it can be seen that if the rate of carrier precipitate formation is relatively fast with respect to the rates of ionic diffusion near the forming particle surfaces, the localized diffusion times are relatively small and more heavy metals are occluded.

The choices of carrier precipitate and operating procedures are therefore preferably made, in part, so as to maximize the rate at which the carrier precipitate is formed. In the preferred embodiment wherein the carrier precipitate is ferric hydroxide, the precipitation rate depends on two reactions, the oxidation of ferrous ions to ferric ions and the reaction of ferric ions with hydroxyl ions. The precipitation rate is almost solely controlled by the oxidation reaction since oxidation is much the slower of the two reactions. Thus, the basic strategy is to maximize the rate of oxidation. Since the oxidation reaction is accelerated as the solution pH is raised, the pH of the reaction medium is maintained as high as possible during the introduction of the oxidizing agent.

The oxidation reaction is also accelerated by the presence of a suitable catalyst. Most soft Lewis bases can be employed as suitable catalysts, with iodine and oxygen-containing soft Lewis bases being preferred. The most preferred catalyst is ferric hydroxide since it is manufactured in situ by the method of the invention. In the continuous process embodiment of the invention illustrated in the drawing, no addition of catalyst is necessary because ferric hydroxide is continually being formed and is constantly present within precipitation vessel 16. In a ferric hydroxide batch process embodiment of the invention, however, it is preferred that a suitable catalyst, most preferably ferric hydroxide product, be mixed with the aqueous waste stream at the time the oxidizing agent is added.

In addition to promoting rapid precipitation, the rapid oxidation of the ferrous ions may promote occlusion in another way. In aqueous solutions, ferrous ions tend to form soluble complexes with heavy metal and hydroxyl ions. If the ferrous ions of such complexes are rapidly oxidized to ferric ions, these complexes tend to precipitate out of solution en masse, including the originally complexed heavy metal ions which, during precipitation, become occluded within the precipitate.

The operating conditions are also preferably controlled to minimize extraneous reactions which interfere with the heavy metal coprecipitation. Thus, the concentration of superfluous ions is maintained as low as practical (for instance, by dilution of the waste stream) since such ions interact with carrier precipitate precursor and heavy metal ions, thereby impeding the coprecipitation reactions. Also, the pH of the aqueous solution is maintained at sufficiently low levels to minimize the effects of complexing agents which solubilize heavy metal ions at high pH. For instance, certain nitrogenous compounds, including ammonia, will complex with several heavy metal ions, especially with copper, nickel and zinc, at pH levels above about 8.0. Where such complexing agents are present in the aqueous solution and where "complexable" heavy metal ions are also present, the pH of the aqueous solution is therefore maintained below about 8.0, preferably below about 7.5. Accordingly, in the embodiment of the invention illustrated in the drawing (wherein aqueous ammonia is used as a base), the pH of the waste solution in precipitation vessel 16 is preferably maintained between about 6.5 and about 7.5 in order to oxidize the ferrous ions as rapidly as possible but not form significant quantities of ammonia-heavy metal complexes. Since this pH operating range is relatively narrow, since the relationship between dissolved ammonia and solution pH is very sensitive within this operating range, and since the pH of the acid waste stream generated in industrial process 6 can fluctuate significantly, pH control is preferably accomplished in two steps. First, the pH of the acid waste stream is raised to pH levels between about 5.5 and about 6.5 within vessel 14. Second, the solution pH is carefully raised to operating levels (preferably between about 6.5 and about 7.5) within precipitation vessel 16.

The method of the invention is unique in its effectiveness for removing substantial quantities of heavy metals from aqueous solutions at near neutral pH. The effective removal of heavy metals at near neutral pH is most advantageous to the industrial operator. It substantially reduces problems caused by the aforementioned presence of heavy metal complexing agents, especially nitrogenous complexing agents, which are commonly found in aqueous waste streams. Accordingly, it allows the additive use of aqueous ammonia, a most cost-effective base. The ability to operate at near neutral pH also eliminates the need to add neutralizing acid to the treated effluent before disposal. Likewise, it markedly reduces the consumption of fresh acid necessary to reacidify the treated effluent when the effluent is employed as a recycle acid. Finally, operating at near neutral pH produces a precipitate which settles faster than precipitates formed at higher pH levels. This last fact allows the operator to separate the treated effluent from the nascent precipitate particles with smaller and less expensive separating equipment than would be required by other precipitation methods.

The preferred embodiment of the invention employing ferric hydroxide as the carrier precipitate has the additional unique advantage over conventional hydroxide precipitation methods of requiring less additive base to precipitate a given quantity of iron and contaminant heavy metals. In conventional alkali-precipitation methods, base is consumed in the precipitation of individual iron ions, and additional base is consumed in the precipitation of individual heavy metal ions. In the embodiment of the invention illustrated in the drawing, base is consumed in the precipitation of individual ferric ions, but little additional base is required to precipitate the heavy metal ions. Furthermore, in the preferred embodiment of the invention, a substantial proportion of the base required by the process is manufactured by the process itself. For every ferrous ion that is oxidized to a ferric ion, a hydroxyl ion is produced pursuant to the following reaction:

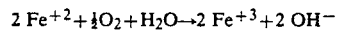

$$2\ Fe^{+2} + \tfrac{1}{2}O_2 + H_2O \rightarrow 2\ Fe^{+3} + 2\ OH^-$$

The method of the invention is also unique in its ability to remove chromium ions from an aqueous waste solution without having to first reduce the hexavalent chromium ions to trivalent ions. Typically in the preferred embodiment of the invention, more than about 95 percent of the hexavalent chromium is removed from the aqueous waste solution at the same time and by the same method as are other heavy metals. Thus, the method of the invention eliminates the need for segregating and separately treating hexavalent chromium-containing waste streams and saves the costs of acid, base, and reducing agent required by such treatment.

Finally, the method of the invention is superior to conventional precipitation methods in that the method of the invention produces less precipitate sludge. The lower sludge production stems, in part, from the fact that the volume of sludge is smaller when several metals are coprecipitated than when those metals are precipitated separately. The difference in sludge-production is even greater when the method of the invention and conventional precipitation methods are compared in the treatment of aqueous solutions containing significant quantities of heavy metal complexing agents. As stated above, the conventional treatment of such aqueous solutions requires the use of large quantities of calcium hydroxide and results in the formation of sludge volumes which are even larger than normal.

The invention can be further understood by considering the foregoing specific examples which are illustrative of specific modes of practicing the invention and are not intended as limiting the scope of the appended claims.

EXAMPLE 1

Two aqueous waste solution samples are obtained from a commercial electroplating process. The first sample is taken from a 10,800 gal/dyy waste water stream containing approximately 0.6 weight percent total dissolved solids. The second sample is taken from a 1,400 gal/day waste acid stream containing approximately 15 weight percent total dissolved solids.

Twenty-three milliliters of the waste acid sample is mixed in a mechanically aggitated beaker with 177 ml of the waste water sample to yield 200 ml of a combined waste solution sample. Immediately thereafter, 4.5 ml of a 28 weight percent aqueous ammonia solution is rapidly added to the beaker. Thereupon, 25 ml of an aqueous solution containing approximately 4 weight percent of a ferric hydroxide-heavy metal precipitate is added to the beaker.

Immediately thereafter, air is commenced to flow through a sintered glass tube at the bottom of the beaker so as to cause air bubbles to rise through the solution. A precipitate is observed to appear within the solution, and the solution pH is observed to begin dropping. Aqueous ammonia is periodically added to the solution over about the next 30 minutes in order to maintain the solution pH between about 7.0 and about 7.5.

After about 30 minutes, the solution pH is observed to stabilize. The flow of air is ceased but the solution is aggitated for an additional 30 minutes.

Thereafter, a pipette is used to extract a sample of the solution-precipitate mixture. The precipitate particles are removed by filtering the sample through #41 (coarse) filter paper. The resulting filtrate is clear and colorless.

The filtrate is analyzed for heavy metals content and compared to the heavy metal content of the original combined waste solution sample The results are presented in TABLE 1.

TABLE 1

| Sample | Metals Concentrations, ppmw | | | | | | | Solution pH |
|---|---|---|---|---|---|---|---|---|
| | Cd | Cr | Cu | Fe | Ni | Pb | Zn | |
| Untreated combined waste solution | 0.6 | 2.3 | 5 | 4,850 | 3.5 | 106 | 953 | 3.5 |
| Treated filtrate after treatment | <0.1 | <0.1 | 1.4 | <0.1 | 0.2 | <0.5 | 2.8 | 7.3 |

EXAMPLE 2

A 50 ml sulfuric acid waste sample from a commercial electroplating process is diluted with distilled water to 200 ml. The waste solution is neutralized by the addition of 17.5 ml of a 28 weight percent aqueous ammonia solution, whereby the solution pH is observed to be 7.7.

The slurry is added to a mechanically agitated beaker containing 22 ml of an aqueous ferric hydroxide slurry. Air is commenced to flow through a sintered glass tube at the bottom of the beaker so as to cause air bubbles to rise through the solution. Aqueous ammonia is periodically added to the solution so as to maintain the solution pH between 7.0 and 7.5.

About 15 minutes after neutralization, the pH of the solution is stabilized at about 7.35 and a precipitate is observed within the solution. Air dispersion is terminated but mechanical agitation is continued. A sample of the solution-precipitate mixture is extracted with a pipette and filtered through coarse filter paper. About 25 minutes after neutralization, a second sample is similarly extracted and filtered. The filtrate from both samples is clear and colorless.

The filtrate from both samples is analyzed for heavy metals content and the results are compared to the heavy metals content of the original acid waste sample. The comparison is summarized in TABLE 2.

TABLE 2

| Sample | Metals Concentration, ppmw | | | | | | SO4 conc. ppmw | Solution pH |
|---|---|---|---|---|---|---|---|---|
| | Cd | Cr | Cu | Fe | Ni | Zn | | |
| Untreated acid waste | 0.75 | 8.75 | 2.0 | 3,625 | 8.5 | 132 | 66,250 | N.T.[1] |
| Treated filtrate 15 minutes after neutralization | <.01 | <.01 | 0.2 | <.01 | 1.7 | 2.1 | N.T. | 7.35 |
| Treated filtrate 25 minutes after neutralization | <.01 | <.01 | 0.2 | <.01 | 1.7 | 2.1 | N.T. | 7.35 |

[1] N.T. denotes that the parameter was not tested.

EXAMPLE 3

A 200 ml volume of a heavy metals-containing acid solution is prepared. The solution is placed in a mechanically agitated beaker and neutralized to a pH between about 7.0 and about 7.5. Immediately thereafter, 0.142 gr of ferric oxide is added to the solution and air is commenced to bubble through the solution. Additional base is periodically added to maintain the solution pH between 7.0 and 7.5. About 7 minutes after neutralization, the solution pH is observed to have stabilized and rust red precipitate particles are visible within the solution. A sample of the solution-precipitate mixture is extracted and filtered with coarse filter paper. The filtrate, which is clear and colorless, is analyzed for heavy metals content.

The solution-precipitate mixture is agitated for an additional 15 minutes (a total of 22 minutes after neutralization) without addition of base or air. A second sample is extracted and filtered through coarse filter paper. The filtrate, which is clear and colorless, is analyzed for heavy metals content.

The solution-precipitate mixture is agitated for an additional 7.5 hours (a total of 18 hours after neutralization). A third sample is extracted and filtered, and the clear, colorless filtrate is analyzed for heavy metals content.

The results of the filtrate heavy metals analyses are compared to the heavy metals content of the original acid solution. A summary of this comparison is set forth in TABLE 3.

TABLE 3

| Sample | Metals Concentration, ppmw | | | | | | Solution pH |
|---|---|---|---|---|---|---|---|
| | Cd | Cr | Cu | Fe | Ni | Zn | |
| Untreated acid solution | 102 | 74 | 96 | 5,684 | 96 | 101 | N.T. |
| Treated filtrate 7 min. after neutralization | 4 | <.01 | 0.2 | <.01 | 3.4 | <0.1 | 7.5 |
| Treated filtrate 22 min. after neutralization | 7 | <.01 | .09 | <.01 | 7.3 | 0.6 | 7.5 |
| Treated filtrate 18 hr. after neutralization | 9.3 | <.01 | .09 | <.01 | 6.7 | 0.8 | 6.9 |

EXAMPLE 4

A sample of an acid waste solution from a commercial galvanizing process is placed in a mechanically agitated beaker, neutralized with aqueous ammonia and oxidized with bubbled air while maintaining the solution pH between about 7.0 and about 8.2. When the solution pH stabilizes, addition of aqueous ammonia and air is discontinued except as noted below.

A solution-precipitate sample is extracted with a pipette 7 minutes after neutralization. The sample is filtered and analyzed for heavy metals. A second sample is also extracted (60 minutes after neutralization), filtered and analyzed for heavy metals. Additional aqueous ammonia is thereupon added to the solution and a third sample is extracted (73 minutes after neutralization). This sample is also filtered and analyzed for heavy metals.

Two additional samples are similarly extracted, filtered and analyzed for heavy metals. The results of all analyses are summarized in TABLE 4.

TABLE 4

| Sample | Metals Concentration, ppmw | | | | | | | Solution pH |
|---|---|---|---|---|---|---|---|---|
| | Cd | Cr | Cu | Fe | Ni | Pb | Zn | |
| Untreated acid waste | 6.25 | 256 | 72 | 54,400 | 206 | 5,125 | 354 | N.T. |
| Treated filtrate 60 minutes after neutralization | <.01 | <.01 | 5.6 | 1.3 | 6.6 | <0.5 | 1.2 | 7.0 |
| Treated filtrate after base added, 73 minutes after neutralization | <.01 | <.01 | 7.2 | <.01 | 3.2 | <0.5 | 0.6 | 7.8 |
| Treated filtrate 120 minutes after neutralization | <.01 | <.01 | 5.4 | <.01 | 1.5 | 0.6 | 0.6 | 7.6 |
| Treated filtrate 2 months after neutralization | 0.2 | <.01 | 0.9 | 0.4 | 0.5 | <2.5 | <0.4 | N.T. |

EXAMPLE 5

A 50 ml acid waste sample from a commercial electroplating process is added to a mechanically agitated beaker and diluted with distilled water to 200 ml. To this diluted solution is added 18 ml of a 28 weight percent aqueous ammonia solution, whereby the solution pH is observed to be 7.0. An additional 10 weight percent iron is added to the solution in the form of ferric hydroxide particles. Immediately thereafter, air is bubbled through the solution. Aqueous ammonia is periodically added to maintain the solution pH between 7.0 and 7.5.

After about 8 minutes, the solution pH is observed to have stabilized. A sample is extracted with a pipette, filtered and analyzed for heavy metals.

Air dispersion is halted but solution agitation is continued. The pH of the solution is raised to about 9.0. A second sample is immediately extracted, filtered and analyzed for heavy metals.

The solution is agitated for an additional 60 minutes during which time aqueous ammonia is periodically added to maintain the pH at about 9.0. A third sample is extracted, filtered and analyzed for heavy metals.

The results are summarized in TABLE 5.

TABLE 5

| Sample | Metals Concentrations, ppmw | | | | | | | Solution pH |
|---|---|---|---|---|---|---|---|---|
| | Cd | Cr | Cu | Fe | Ni | Pb | Zn | |
| Untreated waste acid | 0.75 | 8.75 | 2 | 3,625 | 8.5 | 132 | 132 | N.T. |
| 8 min. after neutralization | 0.04 | <0.01 | 0.2 | 0.3 | 0.7 | <0.05 | 2.4 | 7.0 |
| 10 min. after neutralization | 0.1 | <0.01 | 1.6 | 0.3 | 3.3 | <0.05 | 30 | 9.0 |
| 70 min. after neutralization | 0.1 | <0.01 | 1.6 | 0.3 | 2.6 | <0.05 | 30 | 9.0 |

Having now described the invention, I claim:

1. A method for removing heavy metal ions from an aqueous solution containing heavy metal ions and ferrous ions, comprising:
   (a) adding ferrous ions to said solution so as to increase the molar ratio of ferrous ions to heavy metal ions;
   (b) rapidly oxidizing in a reaction zone essentially all ferrous ions in said solution to ferric ions while controlling the pH of said solution with added base so as to rapidly form a substantially completely amorphous precipitate comprising a substantial proportion of ferric hydroxide and a substantial proportion of said heavy metal ions; and
   (c) separating said amorphous precipitate from said solution so as to form an effluent solution having a reduced concentration of heavy metal ions;

wherein said aqueous solution contains ferrous ions and at least four heavy metals selected from the group consisting of copper, chromium, lead, nickel, cadmium, and zinc, and wherein said amorphous precipitate contains essentially all the iron introduced into said reaction zone and further contains at least four of said heavy metals, one of which being nickel, lead, or copper and two of which being chromium and zinc, removed by at least the percentage shown in the following table:

| Heavy Metal | Removal Efficiency |
|---|---|
| chromium | 100% |
| nickel | at least 94.3% |
| copper | at least 98.8% |
| lead | at least 99.5% |
| cadmium | at least 96.8% |
| zinc | at least 99.7% | wherein at least 95% of all heavy metals in said aqueous solution are removed from said solution by said precipitate, and wherein the added base consists of aqueous ammonia, and wherein essentially none of said precipitate is recycled back to said reaction zone.

2. A method for removing heavy metal ions from an aqueous solution containing heavy metal ions and ferrous ions, said method comprising:
   (a) rapidly oxidizing essentially all ferrous ions in said solution in a reaction zone to ferric ions at a pH controlled with ammonia so as to rapidly form a substantially completely amorphous precipitate comprising a substantial proportion of ferric hydroxide and a substantial proportion of said heavy metal ions; and (b) separating said amorphous precipitate from said solution so as to form an effluent solution having a reduced concentration of heavy metal ions;

wherein essentially no solid particulate matter is introduced into said reaction zone.

3. A method for removing heavy metal ions from an aqueous solution containing heavy metal ions and ferrous ions, said method comprising:
   (a) introducing said solution into a reaction zone wherein essentially all of said ferrous ions are substantially simultaneously subjected to sufficiently strong oxidizing conditions so as to rapidly oxidize ferrous ions and rapidly form in said reaction zone a substantially completely amorphous precipitate comprising a substantial proportion of ferric hydroxide and a substantial proportion of said heavy metal ions, with the pH of said solution in said reaction zone being controlled with a base consisting of aqueous ammonia; and
   (b) separating said amorphous precipitate from said solution so as to form an effluent solution having a reduced concentration of heavy metal ions;

wherein (1) none of the separated amorphous precipitate is returned to said reaction zone; (2) said oxidizing is carried out by introducing an oxygen-containing gas into the reaction zone; (3) the mean residence time of said solution in said reaction zone is no more than about 15 minutes; (4) more than about 95 weight percent of all heavy metals are removed by said amorphous precipitate formed in said reaction zone; (5) said heavy metals include one or more metals selected from the group consisting of lead, cadmium, gold, tin, nickel, silver, and copper; (6) the contents of said reaction zone are maintained at high agitation, at least in part, by means of a mechanical agitator; (7) said solution is introduced into said reaction zone along with sufficient added ferrous iron to provide at least 3,625 ppm ferrous iron; (8) said aqueous solution contains at least one heavy metal selected from the group consisting of tin, gold, and silver, (9) the pH in said reaction zone is controlled to between about 6.5 and 8.0; (10) the aqueous solution is an acid waste, the pH of which is raised to between about 5.5 and 6.5 prior to introduction into said reaction zone; and (11) said aqueous solution contains ferrous ions and at least four heavy metals selected from the group consisting of copper, chromium, lead, nickel, cadmium, and zinc, and wherein said amorphous precipitate contains essentially all the iron introduced into said reaction zone and further contains at least four of said heavy metals, one of which being nickel, lead, or copper and two of which being zinc and chromium, removed by at least the percentage shown in the following table:

| Heavy Metal | Removal Efficiency |
| --- | --- |
| chromium | 100% |
| nickel | at least 94.3% |
| copper | at least 98.8% |
| lead | at least 99.5% |
| cadmium | at least 96.8% |
| zinc | at least 99.7%. |

4. A continuous method for removing heavy metal ions from a flowing aqueous solution containing ferrous ions and heavy metal ions, said method comprising:
   (a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with ammonia so as to form by coprecipitation a substantially completely amorphous precipitate comprising a substantial proportion of ferric hydroxide and a substantial proportion of said heavy metal ions;
   (b) withdrawing a flowing stream of aqueous solution of reduced concentration of heavy metal ions and said amorphous precipitate; and
   (c) separating said amorphous precipitate from said aqueous solution of reduced heavy metal ion concentration;

wherein said aqueous solution contains ferrous ions and at least four heavy metals selected from the group consisting of copper, chromium, lead, nickel, cadmium, and zinc, and wherein said amorphous precipitate contains essentially all the iron introduced into said reaction zone and further contains at least four of said heavy metals, one of which being nickel, lead, or copper and at least two of which being chromium, and zinc, removed by at least the percentage shown in the following table:

| Heavy Metal | Removal Efficiency |
| --- | --- |
| chromium | 100% |
| nickel | at least 94.3% |
| copper | at least 98.8% |
| lead | at least 99.5% |
| cadmium | at least 96.8% |
| zinc | at least 99.7% | wherein at least 95% of all heavy metals in said aqueous solution are removed from said solution by said precipitate, and wherein the added base consists of aqueous ammonia and wherein essentially none of said precipitate is recycled back to said reaction zone.

5. A continuous method for removing heavy metal ions from a flowing aqueous solution containing ferrous ions and heavy metal ions, said method comprising:
   (a) adding ferrous ions to said flowing aqueous solution so as to increase the molar ratio of ferrous ions to said heavy metal ions;
   (b) flowing said aqueous solution containing added ferrous ions into a reaction zone maintained under conditions which substantially simultaneously and immediately subject essentially all of the ferrous ions entering the reaction zone to oxidizing conditions causing rapid oxidation of ferrous ions while the pH is controlled within said reaction zone so as to rapidly form by coprecipitation a substantially completely amorphous precipitate comprising a substantial proportion of ferric hydroxide and a substantial proportion of said heavy metal ions;
   (c) withdrawing a flowing stream of aqueous solution of reduced concentration of heavy metal ions and said amorphous precipitate; and
   (d) separating said amorphous precipitate from said aqueous solution of reduced heavy metal ion concentration;

wherein essentially no solid particulate matter is introduced into said reaction zone.

6. A continuous method for removing heavy metal ions from a flowing aqueous solution containing ferrous ions and heavy metal ions, including hexavalent chromium ions and one or more metals selected from the group consisting of lead, cadmium, silver, gold, tin, nickel, and copper, said method comprising:

(a) flowing said aqueous solution into a reaction zone maintained under conditions which substantially simultaneously and immediately subject essentially all of the ferrous ions entering the reaction zone to oxidizing conditions causing rapid oxidation of essentially all of said ferrous ions while the pH is controlled within said reaction zone so as to rapidly form by coprecipitation a substantially completely amorphous precipitate consisting essentially of said heavy metals on a carrier precipitate consisting essentially of ferric hydroxide, said heavy metal ions being removed by more than about 95 weight percent, including greater than 95% of said hexavalent chromium ions contained in said flowing aqueous stream prior to treatment in step (a), while the resultant aqueous solution contains said heavy metals in concentrations below their equilibrium values;

(b) withdrawing a flowing stream of aqueous solution of reduced concentration of heavy metal ions and said amorphous precipitate; and (c) separating said amorphous precipitate from said aqueous solution of reduced heavy metal ion concentration;

wherein essentially no solid particulate matter is introduced into said reaction zone.

7. A continuous method for removing heavy metal ions from a flowing aqueous solution containing ferrous ions and heavy metal ions selected from the group consisting of nickel, copper, chromium, lead, tin, gold, and silver, said method comprising:

(a) adding ferrous ions to said flowing aqueous solution so as to increase the molar ratio of ferrous ions to said heavy metal ions;

(b) flowing said aqueous solution containing added ferrous ions into a reaction zone maintained under conditions which substantially simultaneously and immediately subject essentially all of the ferrous ions entering the reaction zone to oxidizing conditions causing rapid oxidation of essentially all of said ferrous ions while the pH is controlled within said reaction zone so as to rapidly form by coprecipitation a substantially completely amorphous precipitate consisting essentially of said heavy metals on a carrier precipitate consisting essentially of ferric hydroxide, said heavy metal ions being removed by more than about 95 weight percent and the resultant aqueous solution containing said heavy metals in concentrations below their equilibrium values;

(c) withdrawing a flowing stream of aqueous solution of reduced concentration of heavy metal ions and said amorphous precipitate; and (d) separating said amorphous precipitate from said aqueous solution of reduced heavy metal ion concentration; ps wherein (1) the residence time of said aqueous solution in said reaction zone is less than about 30 minutes; (2) more than about 95 weight percent of said heavy metals are removed by said amorphous precipitate formed in the reaction zone; (3) said oxidizing is carried out by introducing an oxygen-containing gas into the reaction zone and said solution is maintained at high agitation by a mechanical agitator in said reaction zone; and (4) essentially no solid particulate matter is introduced into said reaction zone.

8. A continuous method for removing heavy metal ions from a flowing aqueous solution containing ferrous ions and heavy metal ions selected from the group consisting of nickel, copper, chromium, lead, tin, gold, and silver, said method comprising:

(a) adding ferrous ions to said flowing aqueous solution so as to increase the molar ratio of ferrous ions to said heavy metal ions;

(b) flowing said aqueous solution containing added ferrous ions into a reaction zone maintained under conditions which substantially simultaneously and immediately subject essentially all of the ferrous ions entering the reaction zone to oxidizing conditions causing rapid oxidation of essentially all of said ferrous ions while the pH is controlled within said reaction zone so as to rapidly form by coprecipitation a substantially completely amorphous precipitate consisting essentially of said heavy metals on a carrier precipitate containing essentially of ferric hydroxide, said heavy metal ions being removed by more than about 95 weight percent and the resultant aqueous solution containing said heavy metals in concentrations below their equilibrium values;

(c) withdrawing a flowing stream of aqueous solution of reduced concentration of heavy metal ions and said amorphous precipitate; and (d) separating said amorphous precipitate from said aqueous solution of reduced heavy metal ion concentration;

wherein (1) the residence time of said aqueous solution in said reaction zone is less than about 15 minutes; (2) said oxidizing is carried out by introducing an oxygen-containing gas into the reaction zone and said solution is maintained at high agitation by a mechanical agitator in said reaction zone; (3) during step (b), at least about 95% of said amorphous precipitate is formed within about 15 minutes; (4) a substantial proportion of the heavy metal ions contained in said aqueous solution prior to step (a) is occluded within said amorphous precipitate; (5) in step (b) a catalytic amount of a ferric hydroxide catalyst is added so as to enhance the speed of oxidation of said ferrous ions to ferric ions; (6) the addition of ferrous ions in step (a) increases the molar ratio of ferrous ions to total heavy metal ions from below 1:1 to above 1:1, (7) said aqueous solution prior to step (a) contains copper, nickel, or zinc ions and wherein said precipitate contains more than 95 weight percent of said copper, nickel or zinc ions; (8) the pH of said solution, prior to step (b), is increased by adding a base to said solution but not to a pH value causing precipitation prior to step (b), said solution being an acid waste; (9) the concentration of heavy metal ions in said aqueous solution prior to step (a) is greater than about 1,000 ppmw whereas the heavy metal ions in the aqueous solution in step (c) is below about 15 ppmw; (10) the pH is controlled in step (b) by addition of ammonia and wherein said heavy metal ions contained in said aqueous solution prior to step (a) comprise hexavalent chromium ions and wherein said amorphous precipitate formed in step (b) contains greater than about 95% of said hexavalent chromium ions; and (11) the pH of the solution in said reaction zone is controlled to between about 6.5 and 8.0, and prior to step (b), the pH is increased to a value between 5.5 and 6.5.

9. A method as defined in claim 8 wherein said heavy metals comprise tin, with at least 95% thereof being removed from said aqueous solution by said precipitate.

10. A method as defined in claim 9 wherein some of the effluent solution, produced after separation of the amorphous precipitate, is blended with acid and recycled to said reaction zone, and none of the separated amorphous precipitate is returned to said reaction zone.

11. A method as defined in claim 10 wherein said aqueous solution contains ferrous ions and one or more heavy metals selected from the group consisting of copper, chromium, lead, nickel, cadmium, and zinc, and wherein said amorphous precipitate contains essentially all the iron introduced into said reaction zone and further contains at least one of said heavy metals removed by at least the percentage shown in the following table:

| Heavy Metal | Removal Efficiency |
|---|---|
| chromium | 100% |
| nickel | at least 94.3% |
| copper | at least 98.8% |
| lead | at least 99.5% |
| cadmium | at least 96.8% |
| zinc | at least 99.7%. |

12. A method as defined in claim 11 wherein the aqueous solution contains at least two heavy metals which are removed by at least the percentages shown in the table, one of which being nickel, lead, or copper, and wherein at least 95% of all heavy metals in said aqueous solution are removed from said solution by said precipitate.

13. A method as defined in claim 12 wherein the added base consists of aqueous ammonia, and wherein the aqueous solution contains both zinc and chromium, the former of which is removed by at least 99.7% and the latter by 100%, and wherein essentially none of said precipitate is recycled back to said reaction zone, and wherein said aqueous solution contains at least four of said heavy metal listed in said table and removed by the percentages shown in said table.

14. A method for removing heavy metal ions from an aqueous solution containing ferrous ions and heavy metal ions in a ratio of at least four moles of ferrous ions per mole of total heavy metal ions, comprising:
(a) in a reaction zone wherein the mean residence time for said aqueous solution is less than about 15 minutes, contacting said ferrous ions with air in the presence of a catalytic amount of a ferric hydroxide catalyst and adding ammonia to control the pH of said aqueous solution in said reaction zone so as to rapidly oxidize essentially all of said ferrous ions to ferric ions and rapidly form a substantially completely amorphous precipitate comprising a substantial proportion of ferric hydroxide and at least 95 weight percent of said heavy metal ions wherein said ferric hydroxide catalyst comprises at least a portion of said amorphous precipitate;
(b) withdrawing from said reaction zone a slurry comprising said aqueous solution and said amorphous precipitate; and
(c) separating said amorphous precipitate from said aqueous solution so as to form an effluent solution containing less than about 15 ppmw total heavy metal ions;
wherein the pH of the solution in said reaction zone is controlled to between about 6.5 and 8.0, and prior to step (b), the pH is increased to a value between 5.5 and 6.5.

15. A method for removing heavy metal ions from an aqueous solution containing heavy metal ions and ferrous ions, said method comprising:
(a) introducing said solution into a reaction zone wherein essentially all of said ferrous ions are substantially simultaneously subjected to sufficiently strong oxidizing conditions so as to rapidly oxidize ferrous ions and rapidly form in said reaction zone a substantially completely amorphous precipitate comprising a substantial proportion of ferric hydroxide and a substantial proportion of said heavy metal ions, with the pH of said solution in said reaction zone being controlled with ammonia; and
(b) separating said amorphous precipitate from said solution so as to form an effluent solution having a reduced concentration of heavy metal ions:
wherein none of the separated amorphous precipitate is returned to said reaction zone.

16. The method of claim 15 wherein:
(1) said oxidizing is carried out by introducing an oxygen-containing gas into the reaction zone;
(2) the mean residence time of said solution in said reaction zone is no more than about 30 minutes;
(3) more than about 95 weight percent of the heavy metals are removed by said amorphous precipitate formed in said reaction zone;
(4) said heavy metals include one or more metals selected from the group consisting of lead, cadmium, gold, tin, nickel, silver, and copper; and
(5) the contents of said reaction zone are maintained at high agitation, at least in part, by means of a mechanical agitator.

17. The method of claim 16 wherein said solution contains zinc as a heavy metal, with said amorphous precipitate subsequently containing at least 99.7% of said zinc.

18. The method of claim 17 wherein said solution is introduced into said reaction zone along with sufficient added ferrous iron to provide at least 3,625 ppm ferrous ions.

19. The method of claim 18 wherein said aqueous solution contains tin, with said amorphous precipitate subsequently containing greater than 95% of the tin originally in said aqueous solution.

20. The method of claim 18 wherein said aqueous solution contains at least one heavy metal selected from the group consisting of tin, gold, and silver, with said amorphous precipitate subsequently containing greater than 95% of said at least one heavy metal.

21. The method of claim 20 wherein:
(6) the mean residence time in reaction zone is no more than 15 minutes; and
(7) the pH in said reaction zone is controlled to between about 6.5 and 8.0.

22. The method of claim 21 wherein the aqueous solution is an acid waste, the pH of which is raised to between about 5.5 and 6.5 prior to introduction into said reaction zone.

23. The method of claim 17 wherein said aqueous solution contains at least one heavy metal selected from the group consisting of tin, gold, and silver, with said amorphous precipitate subsequently containing greater than 95% of said at least one heavy metal.

24. A continuous method for removing heavy metal ions from a flowing aqueous solution containing ferrous ions and heavy metal ions, said method comprising:
(a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with ammonia so as to form by coprecipitation a substantially completely amorphous precipitate comprising a substantial proportion of ferric hydroxide and a substantial proportion of said heavy metal ions;

(b) withdrawing a flowing stream of aqueous solution of reduced concentration of heavy metal ions and said amorphous precipitate; and (c) separating said amorphous precipitate from said aqueous solution of reduced heavy metal ion concentration;

wherein none of the separated amorphous precipitate is returned to said reaction zone.

25. The method of claim 24 wherein:
(1) said oxidizing is carried out by introduction an oxygen-containing gas into the reaction zone;
(2) the mean residence time of said solution in said reaction zone is no more than about 30 minutes;
(3) more than about 95 weight percent of the heavy metals are removed by said amorphous precipitate formed in said reaction zone;
(4) said heavy metals include one or more metals selected from the group consisting of lead, cadmium, gold, tin, nickel, silver, and copper; and
(5) the contents of said reaction zone are maintained at high agitation, at least in part, by means of a mechanical agitator.

26. The method of claim 25 wherein ferrous ions, additional to any originally present in said flowing aqueous solution, are introduced into said reaction zone.

27. The method of claim 26 wherein said flowing aqueous solution contains, as at least one heavy metal, hexavalent chromium ions, with said amorphous precipitate subsequently containing greater than 95% of said metals.

28. The method of claim 27 wherein:
(6) the mean residence time in said reaction zone is no more than 15 minutes; and
(7) the pH in said residence zone is controlled to between about 6.5 and 8.0;
(8) the molar ratio of ferrous ion to heavy metal ions in said flowing aqueous solution is below 1:1 but the rate at which ferrous ions are added to said reaction zone increase said ratio to above 1:1;
(9) the concentration of heavy metal ions in said aqueous solution of reduced heavy metal ion concentration is less than 5 ppmw.

29. The method of claim 28 wherein the flowing solution is an acid waste, the pH of which is raised to between about 5.5 and 6.5 prior to introduction into said reaction zone.

30. The method of claim 29 wherein the concentration of heavy metals in said flowing aqueous solution is greater than about 1000 ppmw, and the amount of ferrous iron added to said reaction zone is sufficient to increase the molar ratio of ferrous ion to heavy metal ions above 4:1.

31. The method of claim 30 wherein said aqueous solution contains at least one heavy metal selected from the group consisting of tin, gold, and silver, with said amorphous precipitate subsequently containing greater than 95% of said at least one heavy metal.

32. The method of claim 24 or 31 wherein said aqueous solution is introduced into said reaction zone along with sufficient added ferrous iron to provide at least 3,625 ppm ferrous iron.

33. The method of claim 32 wherein said solution contains zinc as a heavy metal, with said amorphous precipitate subsequently containing at least 99.7% of said zinc.

34. A method for removing heavy metal ions from an aqueous solution containing heavy metal ions and ferrous ions, said method comprising:

(a) coprecipitating in a reaction zone said heavy metals into an amorphous ferric hydroxide carrier precipitate by rapidly oxidizing said ferrous ions to ferric cations with molecular oxygen while controlling the pH of said solution with added base so as to rapidly form a substantially completely amorphous precipitate comprising a substantial proportion of ferric hydroxide coprecipitated with a substantial proportion of said heavy metal ions, with at least some of said heavy metals being occluded within said precipitate; and (b) separating said amorphous precipitate from said solution so as to form an effluent solution having a reduced concentration of heavy metal ions;

wherein essentially no solid particulate matter is introduced into said reaction zone.

35. A continuous method for removing heavy metal ions from a flowing aqueous solution containing ferrous ions and heavy metal ions, said method comprising:

(a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with added base so as to coprecipitate a substantially completely amorphous precipitate comprising a substantial amount of ferric hydroxide coprecipitated with a substantial proportion of said heavy metal ions, with all heavy metals being removed from the aqueous solution to values below their thermodynamic equilibrium levels and with a substantial proportion of said heavy metals being occluded within said amorphous precipitate;

(b) withdrawing a flowing stream of aqueous solution of reduced concentration of heavy metal ions and said amorphous precipitate; and (c) separating said amorphous precipitate from said aqueous solution of reduced concentration of heavy metal ions;

wherein (1) said aqueous solution contains at least two cations selected from the group consisting of zinc, nickel, copper, chromium, lead, and cadmium; (2) said oxidizing is carried out by introducing an oxygen-containing gas into the reaction zone; (3) the mean residence time of said solution in said reaction zone is no more than about 15 minutes; (4) said heavy metals include one or more metals selected from the group consisting of lead, gold, tin, silver, and copper; (5) the pH in said reaction zone is controlled to between about 6.5 and 8.0; (6) the molar ratio of ferrous ion to heavy metal ions in said flowing aqueous solution is below 1:1 but the rate at which ferrous ions are added to said reaction zone increase said ratio to above 1:1; (7) the concentration of heavy metal ions in said aqueous solution of reduced heavy metal ion concentration is less than 5 ppmw; (8) the flowing solution is an acid waste, the pH of which is raised to between about 5.5 and 6.5 prior to introduction into said reaction zone; (9) the contents of said reaction zone are maintained at high agitation, at least in part, by means of a mechanical agitator; (10) the concentration of heavy metals in said flowing aqueous solution is greater than about 1000 ppmw; (11) said solution contains zinc as a heavy metal, with said amorphous precipitate subsequently containing at least 99.7% of said zinc; (12) said aqueous solution contains at least one heavy metal selected from the group consisting of tin, gold, and silver, with said amorphous precipitate subsequently containing greater than 95% of said at least one heavy metal; and (13) essentially no solid particulate matter is introduced into said reaction zone.

36. A continuous method for removing heavy metal ions from a flowing aqueous solution containing ferrous ions and heavy metal ions, said method comprising:
(a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with added base so as to coprecipitate a substantially completely amorphous precipitate comprising a substantial amount of ferric hydroxide coprecipitated with a substantial proportion of said heavy metal ions, with all of the heavy metals being removed from the aqueous solution to values below their thermodynamic equilibrium levels and with a substantial proportion of said heavy metals being occluded within said amorphous precipitate;
(b) withdrawing a flowing stream of aqueous solution of reduced concentration of heavy metal ions and said amorphous precipitate; and
(c) separating said amorphous precipitate from said aqueous solution of reduced concentration of heavy metal ions;
wherein (1) said aqueous solution contains at least two cations selected from the group consisting of zinc, nickel, copper, chromium, lead, and cadmium; (2) said oxidizing is carried out by introducing an oxygen-containing gas into the reaction zone; (3) the mean residence time of said solution in said reaction zone is no more than about 15 minutes; (4) said heavy metals include one or more metals selected from the group consisting of lead, gold, tin, silver, and copper; (5) the pH in said reaction zone is controlled to between about 6.5 and 8.0; (6) the molar ratio of ferrous ion to heavy metal ions in said flowing aqueous solution is below 1:1 but the rate at which ferrous ions are added to said reaction zone increase said ratio to above 1:1; (7) the concentration of heavy metal ions in said aqueous solution of reduced heavy metal ion concentration is less than 5 ppmw; (8) the flowing solution is an acid waste, the pH of which is raised to between about 5.5 and 6.5 prior to introduction into said reaction zone; (9) the contents of said reaction zone are maintained at high agitation, at least in part, by means of a mechanical agitator; (10) the concentration of heavy metals in said flowing aqueous solution is greater than about 1000 ppmw; (11) said solution contains zinc as a heavy metal, with said amorphous precipitate subsequently containing at least 99.7% of said zinc; and (12) said aqueous solution contains at least one heavy metal selected from the group consisting of tin, gold, and silver, with said amorphous precipitate subsequently containing greater than 95% of said at least one heavy metal.

37. A method as defined in claim 31 or 38 wherein essentially no solid particulate matter is introduced into said reaction zone.

38. A method for removing heavy metal ions from an aqueous solution containing ferrous ions and one or more of said heavy metal ions, comprising:
(a) introducing said solution into a reaction zone wherein essentially all of said ferrous ions are substantially simultaneously subjected to sufficiently strong oxidizing conditions at a controlled pH so as to rapidly oxidize ferrous ions and rapidly form in said reaction zone a substantially completely amorphous precipitate comprising a substantial proportion of ferric hydroxide and a substantial proportion of said heavy metal ions; and
(b) separating said amorphous precipitate from said solution so as to form an effluent solution having a reduced condition of heavy metal ions and returning none of said precipitate to said reaction zone.

39. A method for removing heavy metal ions selected from the group consisting of tin, gold, and silver ions from an aqueous solution containing ferrous ions and one or more of said heavy metal ions, comprising:
(a) flowing said aqueous solution into a reaction zone maintained under conditions which substantially simultaneously and immediately subject essentially all of the ferrous ions entering the reaction zone to oxidizing conditions causing rapid oxidation while the pH is controlled so as to form by coprecipitation a substantially completely amorphous precipitate comprising a substantial proportion of ferric hydroxide and a substantial proportion of said heavy metal ions, with said heavy metals being removed from said aqueous solution to concentration values below their thermodynamic equilibrium level and with at least a substantial proportion of said heavy metals being contained within said precipitate by occlusion;
(b) withdrawing a flowing stream of aqueous solution of reduced concentration of heavy metal ions and said amorphous precipitate; and
(c) separating said amorphous precipitate from said aqueous solution of reduced heavy metal ion concentration;
wherein essentially none of the precipitate produced in the reaction zone is recycled back to said reaction zone.

40. A method as defined in claim 39 wherein said heavy metals comprise tin, with at least 95% thereof removed from said aqueous solution by said precipitate.

41. The method as defined in claim 40 wherein the pH is controlled in said reaction zone by addition by ammonia and wherein said heavy metal ions contained in said aqueous solution prior to step (a) comprise hexavalent chromium ions and wherein said amorphous precipitate contains 100% of said hexavalent chromium ions and wherein said aqueous solution contains at least four heavy metals, which are removed in said reaction zone by at least about 95% each.

42. A method as defined in claim 43 wherein said aqueous solution contains at least four heavy metals and each is removed by at least about 95% in said reaction zone.

43. A method for removing heavy metal ions from an aqueous solution containing ferrous ions and a plurality of said heavy metal ions, comprising:
(a) flowing said aqueous solution into a reaction zone maintained under conditions which substantially simultaneously and immediately subject essentially all of the ferrous ions entering the reaction zone to oxidizing conditions causing rapid oxidation while the pH is controlled so as to form a substantially completely amorphous precipitate comprising a substantial proportion of ferric hydroxide and at least about 95% of each of at least two of said heavy metal ions;

(b) withdrawing a flowing stream of aqueous solution of reduced concentration of heavy metal ions and said amorphous precipitate; and (c) separating said amorphous precipitate from said aqueous solution of reduced heavy metal ion concentration;

wherein essentially no solid particulate matter is introduced into said reaction zone.

44. A method for removing heavy metal ions from an aqueous solution containing ferrous ions and one or more heavy metals selected from the group consisting of copper, chromium, lead, nickel, cadmium, and zinc, said method comprising:

(a) rapidly oxidizing said ferrous ions to ferric cations with molecular oxygen while controlling the pH of said solution with added base so as to rapidly form a substantially completely amorphous precipitate containing essentially all the iron introduced into said reaction zone and further containing at least one of said heavy metals removed by at least the percentage shown in the following table:

| Heavy Metal | Removal Efficiency |
|---|---|
| chromium | 100% |
| nickel | at least 94.3% |
| copper | at least 98.8% |
| lead | at least 99.5% |
| cadmium | at least 96.8% |
| zinc | at least 99.7% |

(b) separating said amorphous precipitate from said solution so as to form an effluent solution having a reduced concentration of heavy metals and containing essentially no iron;

wherein essentially none of the amorphous precipitate removed from said reaction zone is returned thereto.

45. A method as defined in claim 44 wherein said aqueous solution contains copper which is removed from said solution into said precipitate by at least 98.8%.

46. A method as defined in claim 44 wherein said aqueous solution contains cadmium which is removed from said solution into said precipitate by at least 96.8%.

47. A method as defined in claim 44 wherein said aqueous solution contains zinc which is removed from said solution into said precipitate by at least 99.7%.

48. A continuous method for removing heavy metal ions from a flowing aqueous solution containing ferrous ions and heavy metal ions selected from the group consisting of copper, chromium, lead, nickel, cadmium and zinc, said method comprising:

(a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with added base so as to form a substantially completely amorphous precipitate containing essentially all the iron ions introduced into said reaction zone and further containing at least one of said heavy metals removed by at least the percentage shown in the following table:

| Heavy Metal | Removal Efficiency |
|---|---|
| chromium | 100% |
| nickel | at least 94.3% |
| copper | at least 98.8% |
| lead | at least 99.5% |
| cadmium | at least 96.8% |
| zinc | at least 99.7% |

(b) withdrawing a flowing stream of aqueous solution of reduced concentration of heavy metals and said amorphous precipitate; and (c) separating said amorphous precipitate from said aqueous solution of reduced concentration of heavy metal ions;

wherein essentially no solid particulate matter is introduced into said reaction zone.

49. A continuous method for removing heavy metal ions from a flowing aqueous solution containing ferrous ions and heavy metal ions selected from the group consisting of copper, chromium, lead, nickel, cadmium and zinc, said method comprising:

(a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with added base so as to form a substantially completely amorphous precipitate containing essentially all the iron ions introduced into said reaction zone and further containing at least one of said heavy metals removed by at least the percentage shown in the following table:

| Heavy Metal | Removal Efficiency |
|---|---|
| chromium | 100% |
| nickel | at least 94.3% |
| copper | at least 98.8% |
| lead | at least 99.5% |
| cadmium | at least 96.8% |
| zinc | at least 99.7% |

(b) withdrawing a flowing stream of aqueous solution of reduced concentration of heavy metals and said amorphous precipitate; and (c) separating said amorphous precipitate from said aqueous solution of reduced concentration of heavy metal ions;

wherein essentially none of the amorphous precipitate removed from said reaction zone is returned thereto.

50. A method as defined in claim 49 wherein said aqueous solution contains nickel which is removed from said solution into said precipitate by at least 94.3%.

51. A method as defined in claim 49 wherein said aqueous solution contains lead which is removed from said solution into said precipitate by at least 99.5%.

52. A method as defined in claim 49 wherein said aqueous solution contains chromium which is 100% removed from said solution into said precipitate.

53. A method as defined in claim 49 wherein:
(1) the oxidizing is accomplished with air as oxidant;
(2) the mean residence time of said solution in said reaction zone is no more than about 15 minutes;

(3) sufficient ferrous ion is added to the contents of said reaction vessel so as to raise the concentration of ferrous ions therein to at least 3,625 ppm ferrous ion and provide a molar ratio of ferrous ion to heavy metals of at least 1 to 1;

(4) the pH is controlled to between about 6.5 and 8.0 is said reaction zone;

(5) at least 95% of all the heavy metals are removed from said solution into said precipitate; and (6) the concentration of heavy metals in the aqueous effluent recovered after separation of the precipitate is less than 5 ppmw, (7) the aqueous solution contains at least two heavy metals listed in the table, which heavy metals are removed in said reaction zone by at least the percentages shown in the table, one of which heavy metals is nickel, lead, copper, or cadmium.

54. A method as defined in claim 53 wherein:

(8) the pH of the aqueous solution is raised into the range of 5.5 to 6.5 but not to a value causing precipitation prior to entry into said reaction zone;

(9) the contents of said reaction zone are highly agitated with a mechanical agitator; and

(10) the aqueous solution contains at least one of lead or copper at least one of which is removed by at least the percentage shown in the table.

55. A method for removing heavy metal ions from an aqueous solution containing heavy metal ions and ferrous ions, said method comprising:

(a) coprecipitating in a reaction zone said heavy metals into an amorphous ferric hydroxide carrier precipitate by rapidly oxidizing said ferrous ions to ferric cations with molecular oxygen while controlling the pH of said solution with added base so as to rapidly form a substantially completely amorphous precipitate comprising a substantial proportion of ferric hydroxide coprecipitated with a substantial proportion of said heavy metal ions, with at least some of said heavy metals being occluded within said precipitate; and (b) separating said amorphous precipitate from said solution so as to form an effluent solution having a reduced concentration of heavy metal ions;

wherein said aqueous solution contains ferrous ions and at least four heavy metals selected from the group consisting of copper, chromium, lead, nickel, cadmium, and zinc, and wherein said amorphous precipitate contains essentially all the iron introduced into said reaction zone and further contains at least four of said heavy metals, one of which being nickel, lead, or copper and two of which being zinc and chromium, removed by at least the percentage shown in the following table:

| Heavy Metal | Removal Efficiency |
| --- | --- |
| chromium | 100% |
| nickel | at least 94.3% |
| copper | at least 98.8% |
| lead | at least 99.5% |
| cadmium | at least 96.8% |
| zinc | at least 99.7% | wherein at least 95% of all heavy metals in said aqueous solution are removed from said solution by said precipitate, and wherein the added base consists of aqueous ammonia, and wherein essentially none of said precipitate is recycled back to said reaction zone.

56. A continuous method for removing heavy metal ions from a flowing aqueous solution containing ferrous ions and heavy metal ions, said method comprising:

(a) adding ferrous ions to said flowing aqueous solution so as to increase the molar ratio of ferrous ions to said heavy metal ions;

(b) flowing said aqueous solution containing added ferrous ions into a reaction zone maintained under conditions which substantially simultaneously and immediately subject essentially all of the ferrous ions entering the reaction zone to oxidizing conditions causing rapid oxidation of ferrous ions while the pH is controlled within said reaction zone so as to rapidly form by coprecipitation a substantially completely amorphous precipitate comprising a substantial proportion of ferric hydroxide and a substantial proportion of said heavy metal ions;

(c) withdrawing a flowing stream of aqueous solution of reduced concentration of heavy metal ions and said amorphous precipitate; and (d) separating said amorphous precipitate from said aqueous solution of reduced heavy metal ion concentration;

wherein said aqueous solution contains ferrous ions and at least four heavy metals selected from the group consisting of copper, chromium, lead, nickel, cadmium, and zinc, and wherein said amorphous precipitate contains essentially all the iron introduced into said reaction zone and further contains at least four of said heavy metals, at least one of which is nickel, lead, or copper and two of which are chromium and zinc, removed by at least the percentage shown in the following table:

| Heavy Metal | Removal Efficiency |
| --- | --- |
| chromium | 100% |
| nickel | at least 94.3% |
| copper | at least 98.8% |
| lead | at least 99.5% |
| cadmium | at least 96.8% |
| zinc | at least 99.7% | wherein at least 95% of all heavy metals in said aqueous solution are removed from said solution by said precipitate, and wherein the added base consists of aqueous ammonia, and wherein essentially none of said precipitate is recycled back to said reaction zone.

57. A continuous method for removing heavy metal ions from a flowing aqueous solution containing ferrous ions and heavy metal ions, said method comprising:

(a) flowing said aqueous solution into a reaction zone maintained under conditions which substantially simultaneously and immediately subject essentially all of the ferrous ions entering the reaction zone to oxidizing conditions causing rapid oxidation of ferrous ions while the pH is controlled with added base so as to coprecipitate a substantially completely amorphous precipitate comprising a substantial amount of ferric hydroxide coprecipitated with a substantial proportion of said heavy metal ions, with at least one heavy metal being removed from the aqueous solution to a value below its thermodynamic equilibrium level and with a substantial proportion of said heavy metals being occluded within said amorphous precipitate;

(b) withdrawing a flowing stream of aqueous solution of reduced concentration of heavy metal ions and said amorphous precipitate; and (c) separating said amorphous precipitate from said aqueous solution of reduced concentration of heavy metal ions;
wherein none of the separated amorphous precipitate is returned to said reaction zone.

58. A method for removing heavy metal ions from an aqueous solution containing heavy metal ions and ferrous ions, said method comprising:
(a) rapidly oxidizing with molecular oxygen essentially all ferrous ions in said solution in a reaction zone to ferric ions at a pH controlled between about 6.5 and about 8.0 with ammonia or a solution of sodium hydroxide so as to rapidly form a substantially completely amorphous precipitate comprising a substantial proportion of ferric hydroxide and a substantial proportion of said heavy metal ions, said solution containing ferrous ions and heavy metals in a molar ratio of at least 1:1; and
(b) separating said amorphous precipitate from said solution so as to form an effluent solution having a reduced concentration of heavy metal ions.

* * * * *

UNITED STATES PATENT AND TRADEMARK OFFICE
CERTIFICATE OF CORRECTION

PATENT NO.   : 5,013,453
DATED        : May 7, 1991
INVENTOR(S)  : Douglas T. Walker It is certified that error appears in the above-identified patent and that said Letters Patent is hereby corrected as shown below: Title page, item (60):

Under "Related U.S. Application Data" delete "Division of Ser. No. 126,845, Nov. 25, 1987, Pat. No. 4,847,829, which is a continuation of Ser. No. 721,281, Apr. 8, 1985, Pat. No. 4,710,917,".

Under "References Cited - U.S. Patent Documents," "1,825,936" should be --1,824,936-- and on page 2, "4,705,464" should be --4,405,464--.

Column 16, line 20, after "chromium" the comma should be deleted.

Column 17, line 56, "ps" should be deleted.

Column 18, line 17, "containing" should be --consisting--.

Column 20, line 40, "ions" should be --iron--.

Column 21, line 18, "introduction" should be --introducing--.

Column 27, line 7, "is" should be --in--. (our error).

Signed and Sealed this

Nineteenth Day of October, 1993

Attest:

BRUCE LEHMAN

*Attesting Officer*              *Commissioner of Patents and Trademarks*

UNITED STATES PATENT AND TRADEMARK OFFICE
CERTIFICATE OF CORRECTION

PATENT NO. : 5,013,453
DATED : May 7, 1991
INVENTOR(S) : Douglas T. Walker

It is certified that error appears in the above-indentified patent and that said Letters Patent is hereby corrected as shown below:

Column 24, line 18, delete "condition" and insert --concentration--,

Signed and Sealed this

Fifteenth Day of March, 1994

Attest:

BRUCE LEHMAN

Attesting Officer    Commissioner of Patents and Trademarks